United States Patent
Nishida

(10) Patent No.: US 9,448,078 B2
(45) Date of Patent: Sep. 20, 2016

(54) ROUTE SEARCH DEVICE AND ROUTE SEARCH METHOD

(75) Inventor: Junichi Nishida, Miyoshi (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 0 days.

(21) Appl. No.: 14/408,442

(22) PCT Filed: Jun. 21, 2012

(86) PCT No.: PCT/JP2012/065915
§ 371 (c)(1),
(2), (4) Date: Dec. 16, 2014

(87) PCT Pub. No.: WO2013/190689
PCT Pub. Date: Dec. 27, 2013

(65) Prior Publication Data
US 2015/0226564 A1 Aug. 13, 2015

(51) Int. Cl.
G01C 21/34 (2006.01)
G08G 1/0968 (2006.01)
G09B 29/10 (2006.01)
G01C 21/36 (2006.01)

(52) U.S. Cl.
CPC .......... *G01C 21/34* (2013.01); *G01C 21/3453* (2013.01); *G01C 21/3697* (2013.01); *G08G 1/096838* (2013.01); *G08G 1/096844* (2013.01); *G09B 29/106* (2013.01)

(58) Field of Classification Search
None
See application file for complete search history.

(56) References Cited

U.S. PATENT DOCUMENTS

| | | | |
|---|---|---|---|
| 2003/0036848 A1 | 2/2003 | Sheha et al. | |
| 2009/0182498 A1* | 7/2009 | Seymour | G01C 21/20 701/533 |
| 2010/0076968 A1* | 3/2010 | Boyns | G06F 17/30241 707/732 |
| 2011/0291860 A1* | 12/2011 | Ozaki | G01C 21/3694 340/905 |
| 2012/0123667 A1* | 5/2012 | Gueziec | G08G 1/0112 701/119 |
| 2014/0199962 A1* | 7/2014 | Mohammed | H04M 15/70 455/406 |

FOREIGN PATENT DOCUMENTS

| | | |
|---|---|---|
| JP | 2008-193336 A | 8/2008 |
| JP | 2010-038778 A | 2/2010 |
| JP | 2010-210339 A | 9/2010 |
| JP | 2011-002271 A | 1/2011 |
| JP | 2011-237560 A | 11/2011 |
| JP | 2011-247832 A | 12/2011 |
| JP | 2012-018175 A | 1/2012 |

OTHER PUBLICATIONS

Takeshi Kurashima et al., "Travel Route Recommendation Using Geotags in Photo Sharing Site", Proceedings of the 19th ACM International Conference on Information and Knowledge Management, CIKM '10, Jan. 1, 2010, pp. 579-588, XP055190270, New York, New York, USA DOI: 10.1145/1871437.1871513 ISBN: 978-1-45-030099-5.

* cited by examiner

*Primary Examiner* — Adam Tissot
*Assistant Examiner* — Paul Castro
(74) *Attorney, Agent, or Firm* — Sughrue Mion, PLLC

(57) ABSTRACT

A center is provided with an information selecting section for selecting posted pieces of information including a prescribed term from among a plurality of pieces of information posted by users, and a route searching section for searching for a route for a mobile object based on the selected posted pieces of information. The center delivers pieces of information indicating the route searched for by the route search section to a navigation system that has made a request.

12 Claims, 16 Drawing Sheets

Fig.2

| Attribute | Selected Term |
|---|---|
| Road Condition | Not much traffic |
| | Smooth |
| | Now at |
| | Emoticon: (*^_^*).. |
| | Exclamation mark:!.. |
| | . |
| Shop | Delicious |
| | Tasty |
| | Impressed |
| | Overwhelmed |
| | Emoticon: (*^_^*).. |
| | Exclamation mark:!.. |
| | . |
| Scenery | Pretty |
| | Beautiful |
| | Good |
| | Now at |
| | Impressed |
| | Overwhelmed |
| | Emoticon: (*^_^*).. |
| | Exclamation mark:!.. |
| | . |
| Weather | Shine |
| | Good |
| | Shine mark (emoji) |
| | Pleasant |
| | Emoticon: (*^_^*).. |
| | Exclamation mark:!.. |
| | . |

Fig.4

| Time of posting | Content of posting | Position information |
|---|---|---|
| ⋯ o'clock ⋯ minutes | Now on Route A | Longitude, Latitude |
| ⋯ | Rout A isn't (crowded) ~ I1 | ⋯ |
| ⋯ | ⋯ at shop A is (tasty) ~ I2 | ⋯ |
| ⋯ | ⋯ ~ I3 | ⋯ |
| ⋯ | (Impressed) by spot A | ⋯ |
| ⋯ | ⋯ ~ I3 | ⋯ |
| ⋯ | (Now) at shop A | ⋯ |
| ⋯ | Shop B (*^_*^) ~ I4 | ⋯ |
| ⋯ | Shop B was (good) ~ I5 | ⋯ |
| ⋯ | Shop C was so-so | ⋯ |
| ⋯ | Route B is clogged | ⋯ |
| ⋯ | (Overwhelmed) at spot A | ⋯ |
| ⋯ | ⋯ ~ I6 | ⋯ |
| ⋯ | Route C is clogged | ⋯ |
| ⋯ | ⋯ | ⋯ |
| ⋯ | Spot B was boring | ⋯ |
| ⋯ | ⋯ | ⋯ |
| ⋯ | ⋯ | ⋯ |

ROUTE SEARCH DEVICE AND ROUTE SEARCH METHOD

CROSS REFERENCE TO RELATED APPLICATIONS

This application is a National Stage of International Application No. PCT/JP2012/065915 filed Jun. 21, 2012, the contents of all of which are incorporated herein by reference in their entirety.

FIELD OF THE DISCLOSURE

The present invention relates to a route search device and a route search method intended to search for a route to guide a mobile object such as a person or a vehicle.

BACKGROUND OF THE DISCLOSURE

A navigation system mounted on a vehicle generally offers guidance for a route from a departure point to a destination by voice or images, for example. For route guidance, if a driver inputs the name, address, telephone number and the like of a target point through an input device or the like of the navigation system, the navigation system sets the input point as a destination. Then, for driving assistance, the navigation system provides guidance along a route from the current position of the vehicle to the set destination together with surrounding traffic information, for example.

As an example, a system described in Patent Document 1 has been considered to be used as a device for such route search. The system described in Patent Document 1 acquires position information in message information such as that on Twitter (registered trademark) transmitted from a server and searches for a route to a point indicated by the acquired position information. Then, based on route information about the searched route, this system offers the route guidance to the point indicated by the position information.

PRIOR ART DOCUMENTS

Patent Documents

Patent Document 1: Japanese Laid-Open Patent Publication No. 2011-237560

SUMMARY OF THE INVENTION

Problems that the Invention is to Solve

For route guidance, systems including the aforementioned system described in Patent Document 1 generally select a route from multiple candidate routes that minimizes traveling cost such as time or charge for traveling from the departure point to the destination.

Meanwhile, the type and the volume of information transmitted from a server or aggregated in the server including the aforementioned message information and various types of information posted by users are increasing tremendously in recent years. To use such posted information effectively, like in the aforementioned system described in Patent Document 1, route guidance using information except traffic information aggregated in a road traffic information center, specifically message information, has been considered. However, this system is only to select a position indicated by position information in some message information as a destination. Thus, posted information such as message information including various types of information has yet to be used sufficiently by this system.

Accordingly, it is an object of the present invention to provide a route search device and a route search method capable of offering route guidance in a wide variety of ways by using information posted by the user effectively.

Means for Solving the Problems

Means for achieving the above objective and advantages thereof will now be discussed.

To achieve the foregoing objective, a route search device that searches for a route for a mobile object according to the present invention includes an information selecting section that selects one or more posted pieces of information including a prescribed term from multiple pieces of information posted by users and a route searching section that searches for a route for the mobile object based on the selected posted pieces of information.

To achieve the foregoing objective, a route search method for searching for a route for a mobile object according to the present invention includes: an selecting step of selecting one or more posted pieces of information including a term prescribed in advance from multiple pieces of information posted by users; and a searching step of searching for a route for the mobile object based on the selected posted pieces of information.

According to the aforementioned configuration or method, for route search, the posted pieces of information including the prescribed term are selected. Thus, posted pieces of information useful for route search are selected from multiple posted pieces of information including a wide variety of contents. A route for the mobile object is searched for based on the posted pieces of information selected in this way. Thus, while a route is searched for based on an infinite number of posted pieces of information, the searched route reflects a point and the like indicated by the prescribed term. This contributes to effective use of pieces of information posted by the user, contributing to increased variety of route guidance.

In accordance with one aspect of the present invention, the route searching section searches for a route that passes through a particular point indicated by the selected posted pieces of information.

In accordance with one aspect of the present invention, the searching step searches for a route that passes through a particular point indicated by the selected posted pieces of information.

According to the aforementioned configuration or method, if the user sets a destination, a route passing through a particular point indicated by the aforementioned selected posted pieces of information is searched for out of multiple routes along which the destination is accessible from the current location. This allows offering of a route capable of passing through a highly-recommended point and the like indicated by posted pieces of information while offering a route to the destination set by the user.

In accordance with one aspect of the present invention, the posted pieces of information include position information indicating posting positions of the posted pieces of information. The route searching section identifies posting positions of the selected posted pieces of information based on position information about the selected posted pieces of information and searches for a route covering a relatively large number of the identified posting positions.

In accordance with one aspect of the present invention, the posted pieces of information include position information indicating posting positions of the posted pieces of information. The searching step identifies posting positions of the selected posted pieces of information based on position information about the selected posted pieces of information and searches for a route covering a relatively large number of the identified posting positions.

According to the aforementioned configuration or method, the posting position of each posted piece of information is identified based on the posting position in the posted piece of information. A route covering a relatively large number of posting positions is searched for out of routes determined based on the selected posted pieces of information. Thus, the prescribed term is reflected particularly in the searched route. As a result, even if there are an infinite number of routes from the departure point to the destination and there are multiple selected posted pieces of information, a route can still be searched for according to the prescribed term.

In accordance with one aspect of the present invention, the posted pieces of information include position information indicating posting positions of the posted pieces of information. The route search device further includes an information managing section that manages the posted pieces of information in units of predetermined regions based on posting positions of the posted pieces of information and a level setting section that sets a recommendation level of each region for management based on a result of selection of one or multiple posted pieces of information covered in this region.

According to the aforementioned configuration, posted pieces of information are managed in units of predetermined regions and a recommendation level is set for each region. Thus, even if there are an infinite number of posted pieces of information and there are an infinite number of posting positions of these posted pieces of information, these posted pieces of information are managed while predetermined regions are considered as units. A recommendation level of each region for management is set while this region is used as a unit and a route is searched for based on the set recommendation level of each region. Thus, the amount of pieces of information to be processed for setting a recommendation level and searching for a route is reduced. This reduces processing load involved in setting a recommendation level and searching for a route, so that a recommendation level is set and a route is searched for smoothly.

A recommendation level of each region for management is set while this region is used as a unit, so that a recommendation level of a certain region is set based on every posted piece of information covered in this region. Thus, if a posted piece of information including false content, a less-accurate posted piece of information or the like is mixed in each region, such posted piece of information, which might be a cause for noise, can be less influential. This maintains a high degree of reliability of the recommendation level and that of the result of route search.

In accordance with one aspect of the present invention, the information managing section manages the posted pieces of information while using as a unit one of a partitioned region forming a matrix, a region within a predetermined range, and a place name of a posting position. The level setting section sets a recommendation level based on the information amount of posted pieces of information in each region used as the unit.

According to the aforementioned configuration, posted pieces of information are managed while using as units any of partitioned regions forming a matrix, regions within a predetermined range, and place names of posting positions. Thus, an infinite number of posted pieces of information are managed under specific prescriptions.

By managing posted pieces of information while using as units partitioned regions forming a matrix, the posted pieces of information are managed while regions of a common area are used as units. Thus, management units for posted pieces of information can be formed by partitioning more easily and each region formed by the partitioning can be managed more easily.

By managing posted pieces of information while using as units regions within a predetermined range, the posted pieces of information are managed while desired regions are used as units. Thus, posted pieces of information are managed flexibly according to prescribed regions.

By managing posted pieces of information while using place names of posting positions as units, regional characteristics are reflected in setting of a recommendation level and route search. Pieces of information posted in the same region tend to have analogous contents. Thus, by managing posted pieces of information while using a region of the same place name as units, posted pieces of information likely to have common posted contents are managed in units of regions.

In accordance with one aspect of the present invention, the route searching section determines that at least one of traveling time, a traveling distance, and traveling charge required for traveling is traveling cost, and excludes a route by which the determined traveling cost is higher than or equal to a prescribed threshold.

According to the aforementioned configuration, after multiple routes are searched for based on the selected posted pieces of information, traveling cost of each route is determined. Then, a route by which the traveling cost is higher than or equal to a prescribed value is excluded from the multiple searched routes. This means a route of low economic efficiency due to high traveling cost is excluded, so that a route to be presented further makes allowance for traveling cost. As a result, a more useful route is presented.

In accordance with one aspect of the present invention, the information selecting section selects posted pieces of information including a positive term at least about a particular point or shop.

According to the aforementioned configuration, posted pieces of information to be selected includes a term indicating a target that is likely to be visited by the user such as a particular point such as a road or a sightseeing area or a shop to be used by the user. As a result, a route to be searched for can guide the user to the target indicated by such posted piece of information. Thus, only posted pieces of information of significantly high usefulness are selected from an infinite number of posted pieces of information and a route that can offer guidance to a target indicated by the selected posted pieces of information is searched for.

In accordance with one aspect of the present invention, the route search device further includes a route presenting section that presents the searched route.

According to the aforementioned configuration, the route search device includes the route presenting section that can present a route searched by the route search device itself. This allows the route search device to present to the user a route that has been searched for by the route search device itself. As a result, a single device is responsible for route search and presentation of a route.

In accordance with one aspect of the present invention, the route searching section further determines a route while using, as the traveling cost, at least one of traveling time, a traveling distance, and traveling charge required for traveling. The route presenting section presents the determined route and the route searched for based on the selected posted pieces of information.

According to the aforementioned configuration, a route that minimizes traveling cost indicated for example by at least one of traveling time, a traveling distance, and traveling charge is searched for as well as a route to be searched for based on posted pieces of information. Each of the searched routes is presented on the route presenting section. Thus, only a route searched for based on posted pieces of information but also a route searched for based on each traveling cost can be presented. This realizes presentation of routes searched for based on multiple elements, contributing to expansion of a range of selection of routes.

In accordance with one aspect of the present invention, the route search device is provided in a center that collects the posted pieces of information and delivers pieces of information about a route searched for based on the collected posted pieces of information to an information terminal.

According to the aforementioned configuration, the center, where posted pieces of information are collected, searches for a route based on posted pieces of information and delivers pieces of information about the searched route. Thus, route search based on multiple posted pieces of information can be centralized in the center. This achieves delivery of pieces of information about a route to a larger number of information terminals, eventually, presentation of a route searched for based on posted pieces of information to a larger number of users. According to the aforementioned configuration, the enhanced functionality of the center contributes to increase in speed of route search process.

In accordance with one aspect of the present invention, the route search device is provided in an information terminal including a route presenting section that collects the posted pieces of information and presents pieces of information about a route searched for based on the collected posted pieces of information.

According to the aforementioned configuration, the route search device is provided in an information terminal held by the user or an information terminal mounted on a vehicle as a mobile object. Thus, only acquisition of posted piece of information is required in order for the information terminal to search for a route by itself. This allows such an information terminal to search for a route and present information about the route, so that the route is searched for and presented more flexibly.

In accordance with one aspect of the present invention, the information terminal is formed of at least one of a navigation system mounted on a vehicle forming the mobile object and a multifunctional phone capable of executing an application that offers route guidance based on the delivered pieces of information about the route.

A navigation system mounted on a vehicle is used for guiding a driving route of vehicle in many cases and is widely available as a system that can be mounted on a vehicle. In many cases, such a navigation system has a function already installed such as a map database or an application program required for route search, for example. Thus, providing the route search device in such a navigation system contributes to effective use of a route to be searched for based on posted piece of information.

Various functions can be added to a multifunctional phone such as a smartphone by installing application programs on the multifunctional phone. Many multifunctional phones nowadays have the function of route guidance and the function of such guidance has been used widely. Thus, providing the route search device in such a multifunctional phone contributes to expansion of usage of the route search device.

BRIEF DESCRIPTION OF THE DRAWINGS

FIG. 2 shows exemplary terms prescribed as terms registered with a selection map to be used for selecting posted pieces of information;

FIG. 4 shows exemplary posted pieces of information aggregated in the center;

DETAILED DESCRIPTION OF THE PREFERRED EMBODIMENTS

First Embodiment

A route search device and a route search method according to a first embodiment of the present invention will be described below by referring to FIGS. 1 to 8.

Figure 1:
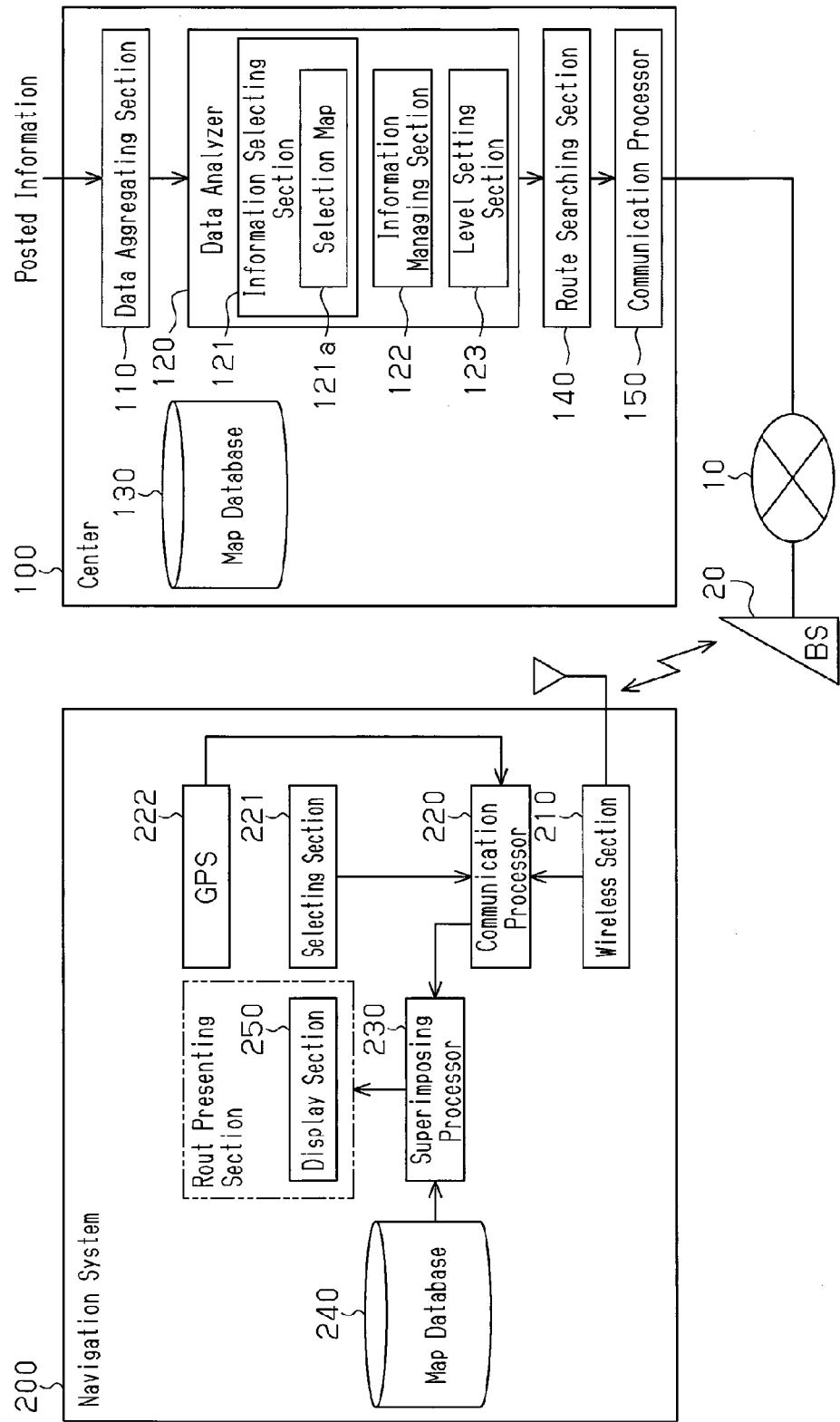
FIG. 1 is a block diagram schematically showing the structure of a center and that of a navigation system to which a route search device and a route search method according to a first embodiment of the present invention are applied.

As shown in FIG. 1, a center 100 to which the route search device and the route search method of this embodiment are applied includes a data aggregating section 110 that aggregates posted pieces of information such as word-of-mouth information or information on Twitter (registered trademark) posted by multiple users through information terminals such as smartphones or personal computers. The posted pieces of information include position information such as latitude and longitude information about the latitude and longitude of a posting position.

The data aggregating section 110 acquires multiple pieces of information posted by multiple users through a network such as the Internet. Then, the data aggregating section 110 outputs the acquired multiple posted pieces of information to a data analyzer 120 that analyzes the posted pieces of information.

The data analyzer 120 includes an information selecting section 121 that selects posted pieces of information including a term prescribed in advance from multiple posted pieces of information acquired by the data aggregating section 110. The data analyzer 120 further includes an information managing section 122 that manages posted pieces of information in units of predetermined regions based on posting positions of this posted pieces of information. The data analyzer 120 further includes a level setting section 123 that sets a recommendation level of each region managed by the information managing section 122.

In response to input of multiple posted pieces of information acquired by the data aggregating section 110, the information selecting section 121 selects posted pieces of information including a term with a positive meaning from the multiple posted pieces of information. The information selecting section 121 of this embodiment holds a selection map 121a in which terms with positive meanings about multiple posting targets are prescribed in advance.

As shown in FIG. 2, in the selection map 121a, multiple attributes including a road condition, a shop, a scenery, and weather are associated with positive terms relating to corresponding attributes. The terms with positive meanings include a prescribed term such as "Now at" indicating expectation for a particular shop or place, for example. The terms with positive meanings prescribed in the selection map 121a further include a term such as "happy" or "fun" indicating a positive impression, for example. The terms with positive meanings prescribed in the selection map 121a further include a face mark or an exclamation mark, for example.

To enable route search based on posted pieces of information of high real-time performance, the information selecting section 121 of this embodiment selects only pieces of information posted for example within 30 minutes and discards other posted pieces of information.

As shown in FIG. 1, the information managing section 122 identifies the posting position of each posted piece of information based on position information included in posted pieces of information selected by the information selecting section 121. The information managing section 122 mentioned herein identifies positions on map data registered with a map database 130 where posted pieces of information were posted. In this way, the information managing section 122 identifies an area where the posted piece of information was posted. Then, the information managing section 122 defines the identified area as a management unit for posted piece of information.

If the information managing section 122 defines a management unit, the level setting section 123 sets a recommendation level of each region based on a selection result about posted piece of information in a region defined as a management unit. The level setting section 123 mentioned herein sets a recommendation level based on the number of posted pieces of information per unit area in each region defined as a management unit. As a result, a region where posted pieces of information indicating positive content were posted relatively more frequently is set at a higher level. In contrast, a region where posted pieces of information indicating positive content were posted relatively less frequently or a region where no such posted pieces of information were posted is set at a lower level. Even in the region where posted pieces of information indicating positive content were posted relatively frequently, a recommendation level is set to be low if the number of posted pieces of information indicating negative contents such as "taste bad" or "boring" posted in this region is greater than or equal to a certain number. After setting the recommendation level in this way, the level setting section 123 outputs information about the set recommendation level to a route searching section 140 and a communication processor 150.

In response to a request for example by a navigation system 200 mounted on a mobile object such as a vehicle to deliver information about a route from the current location of the mobile object to the destination, the route searching section 140 searches for a route for the mobile object based on a result of analysis by the data analyzer 120. The route for the mobile object to be searched for by the route searching section 140 of this embodiment is one or more routes that allow the mobile object to reach the destination while passing through a region at a recommendation level set by the level setting section 123 higher than a predetermined level. A region at a higher recommendation level forms a route covering a relatively larger number of posting positions of selected posted piece of information.

The route searching section 140 of this embodiment calculates cost of traveling along a searched route based on at least one of traveling time, a traveling distance, and traveling charge required for the traveling. Then, the route searching section 140 excludes a route by which the traveling cost is higher than or equal to a predetermined threshold from one or more searched routes. In this way, the route searching section 140 picks out a route to be delivered to the navigation system 200.

If there is no route as a result of exclusion, the route searching section 140 lowers a recommendation level by one step. Then, the route searching section 140 searches for a route based on this recommendation level and calculates traveling cost.

The route searching section 140 searches for a route that achieves the shortest time out of those along which the destination is accessible from the current location of the navigation system 200. Likewise, the route searching section 140 searches for a route that achieves the minimum charge to be paid for example for a toll road out of those along which the destination is accessible from the current location of the navigation system 200.

Then, the route searching section 140 outputs information that was picked out about one or more routes to the communication processor 150.

In response to input of information about a route, the communication processor 150 delivers the information about the route to the navigation system 200 having requested the delivery. The communication processor 150 also delivers information about a recommendation level in units of regions input from the level setting section 123 to the navigation system 200 having requested the delivery.

For communication between the center 100 and the navigation system 200 and the like, a virtual private network (VPN) 10 and a base station (BS) 20 provided by a telecommunications carrier are used as interventions, for example.

The navigation system 200 includes a communication processor 220 that processes communication with the center 100 through a wireless section 210.

In response to setting of a destination by the user made through a selecting section 221, the communication processor 220 transmits information about the destination and latitude and longitude information about the navigation system 200 acquired by a GPS 222 to the center 100. In this way, the communication processor 220 requests the center 100 to deliver information about a route. In response to operation of requesting guidance for local circumstances made through the selecting section 221, the communication processor 220 transmits information about an area covering the requested local circumstances to the center 100.

When information about a route is delivered as a response to a request for delivery from the center 100, the communication processor 220 outputs this information about a route to a superimposing processor 230 that performs display process on this information. Likewise, when information about a recommendation level in a requested area is delivered as a response to a request for delivery from the center 100, the communication processor 220 outputs this information about a recommendation level to the superimposing processor 230.

When information about a route is input from the communication processor 220, the superimposing processor 230 performs process of superimposing this route on a map. Specifically, by referring to map data registered with a map database 240, the superimposing processor 230 displays a map image covering the current location of the vehicle on which the navigation system 200 is mounted and a destination visibly on a display section 250. Then, the superimposing processor 230 superimposes the route searched for by the route searching section 140 on this map image. In this way, one or multiple routes searched for by the route searching section 140 are guided in an image to the user of the navigation system 200.

In this embodiment, the display section 250 forms the aforementioned route presenting section.

When information about a recommendation level is input from the communication processor 220, the superimposing processor 230 performs process of superimposing this recommendation level on a map. The superimposing processor 230 of this embodiment distinguishes each region on a map by color, for example. As a result, a recommendation level set in units of regions by the level setting section 123 is guided in an image to the user of the navigation system 200.

A technique of selecting posted piece of information is described next in detail by referring to FIGS. 2 to 4.

As shown in FIG. 2, in this embodiment, there are terms prescribed in advance to be used for selecting posted pieces of information useful for generating a recommended route from posted pieces of information including an infinite number of posted contents.

Figure 3:
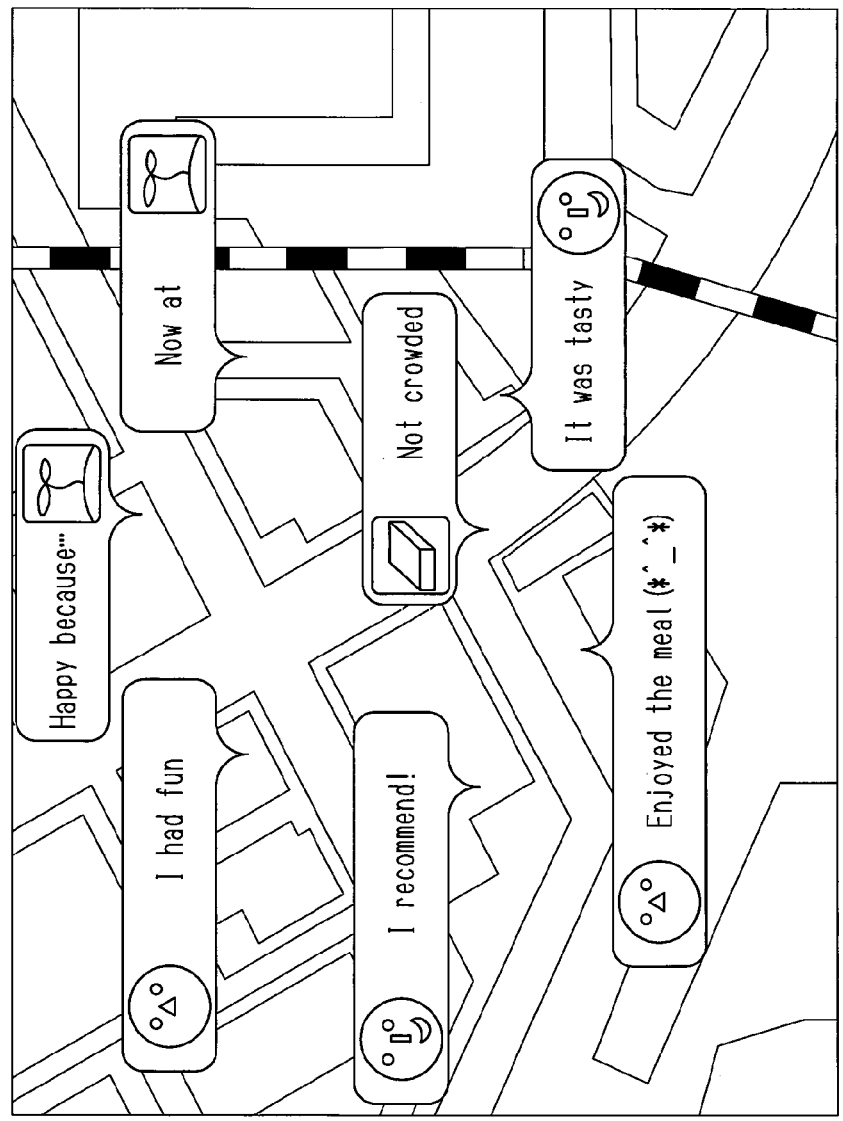
FIG. 3 shows exemplary posted pieces of information displayed on a map.

As shown in FIG. 3, posted pieces of information mentioned in this embodiment are pieces of information about comments on particular points or shops posted by multiple users holding information terminals.

Referring to FIG. 4 showing exemplary posted pieces of information aggregated in the center 100, the posted pieces of information are formed of the date and time of posting, the contents of the posting, and position information about posting positions predetermined as latitudes and longitudes.

Regarding selection of posted pieces of information, posted pieces of information I1 to I6 are selected from posted pieces of information aggregated in a time-series manner in the center 100. The posted pieces of information I1 to I6 were posted within the past 30 minutes in terms of date and time of its posting and include terms with positive meanings prescribed in advance, for example.

After posted pieces of information are selected in this way, a route is generated that passes through a region where the selected pieces of information were posted frequently. In other words, this region is merely a region where the amount of the posted pieces of information is large per unit area.

Figure 5:
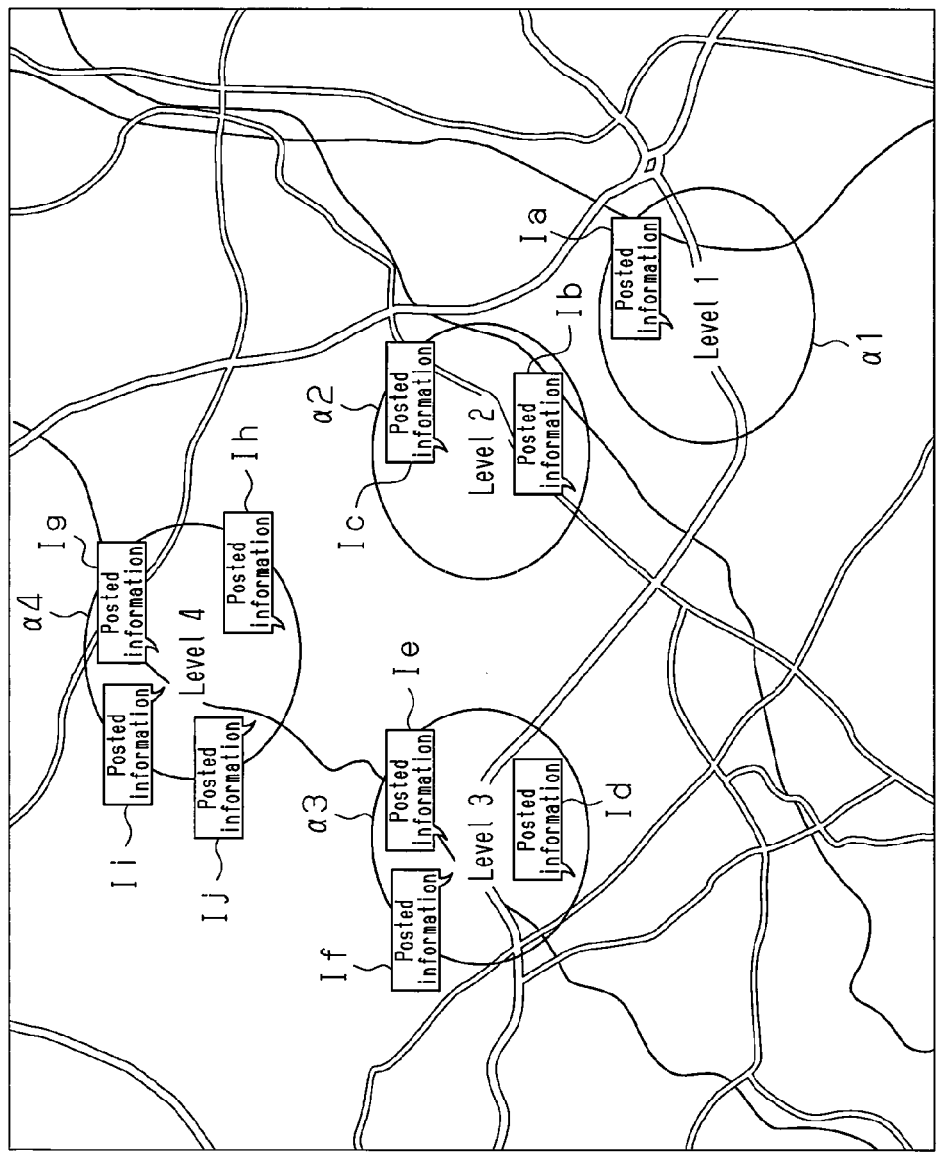
FIG. 5 shows exemplary posted pieces of information managed in units of regions.
Figure 6:
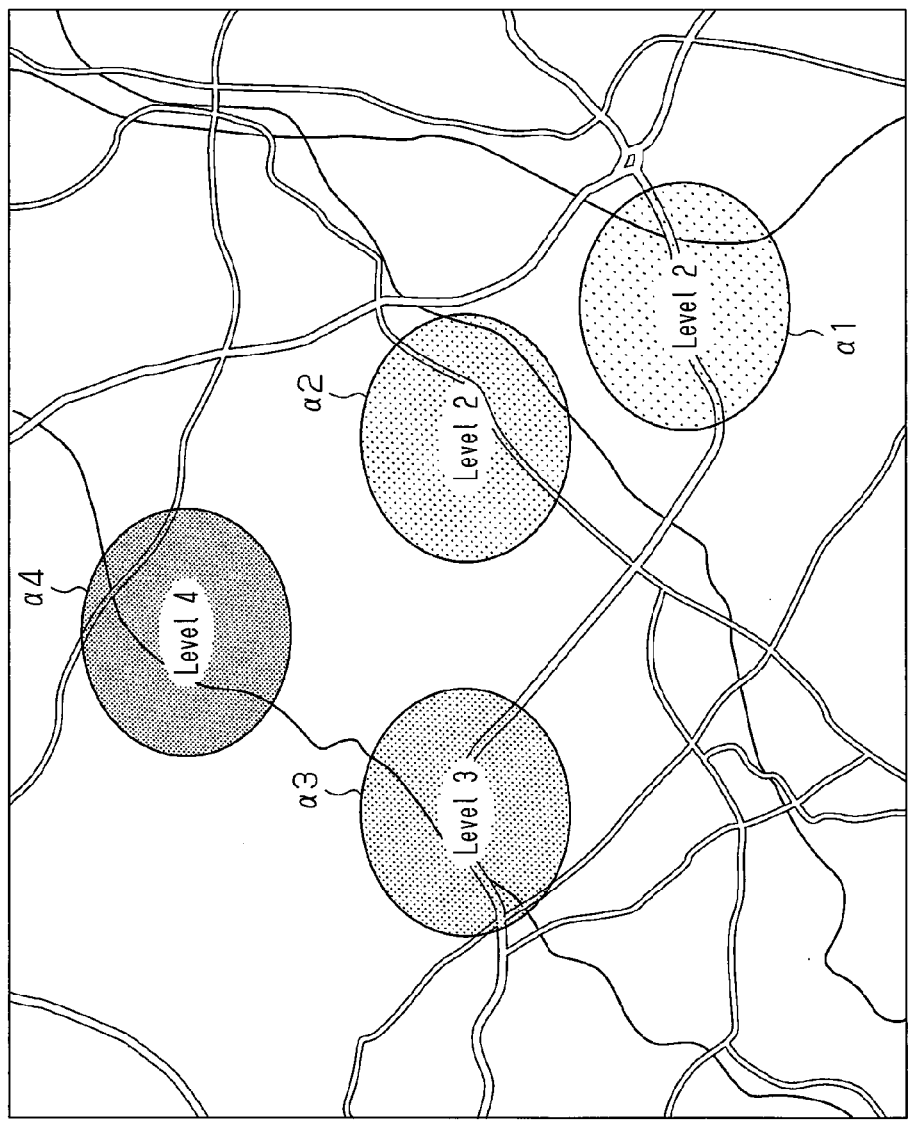
FIG. 6 shows exemplary display of recommendation levels set in units of regions.
Figure 7:
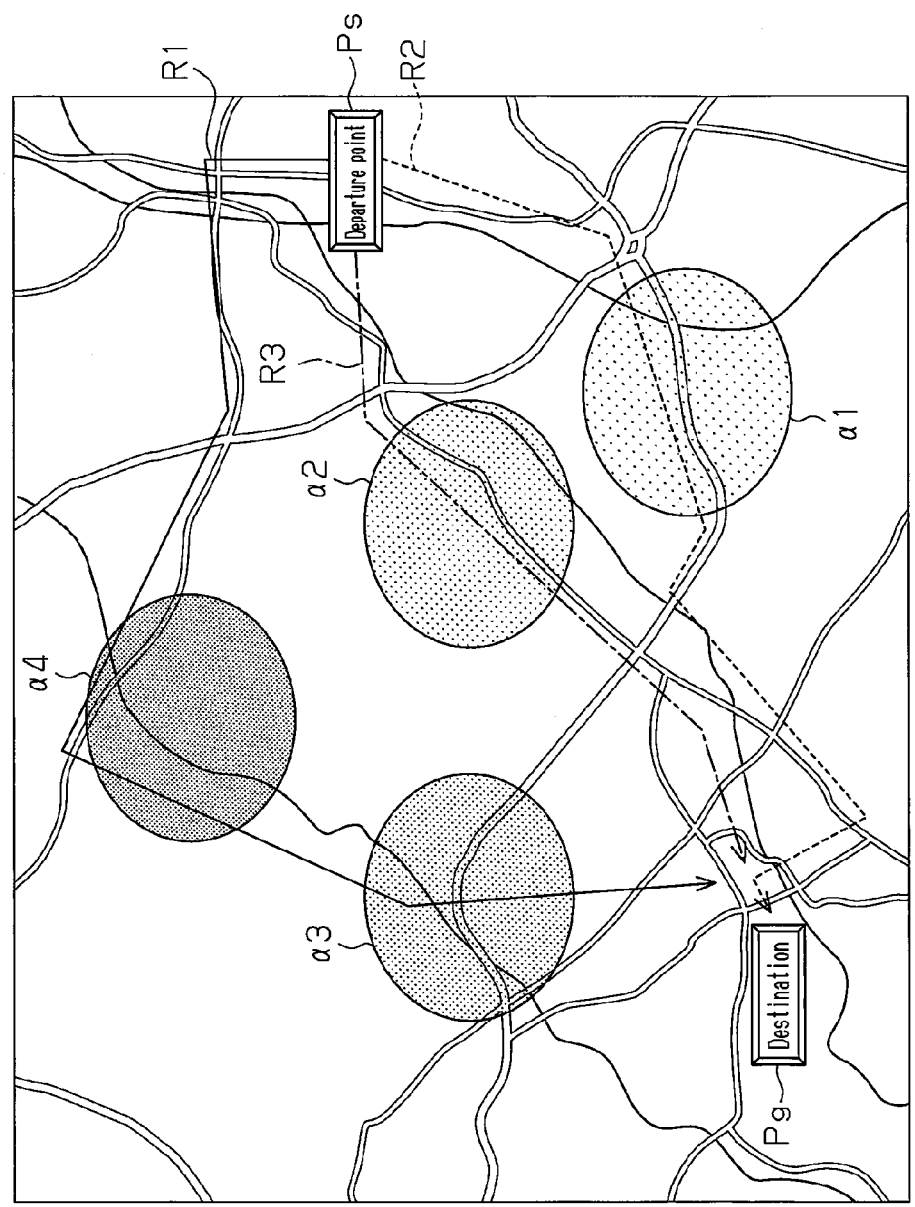
FIG. 7 shows exemplary display of a route searched for based on a recommendation level and a route searched for based on traveling cost.

The following describes how a route is generated and presented in this embodiment by referring to FIGS. 5 to 7.

As shown in FIG. 5, after multiple posted pieces of information Ia to Ij indicating positive contents are posted in some area, the posting position of each of the posted pieces of information Ia to Ij is identified.

Next, based on the posting position of each of the posted pieces of information Ia to Ij, regions $\alpha 1$ to $\alpha 4$ covering highly-recommended shops or points are identified. In this way, the region $\alpha 1$ covering the posting position of one posted piece of information Ia is formed. If there are multiple posted pieces of information indicating positive contents are within one region in a range of a diameter of 10 km, for example, a region covering the respective posting positions of these multiple posted pieces of information is formed. Thus, the following regions are formed: the region $\alpha 2$ covering the respective posting positions of the multiple posted pieces of information Ib and Ic; the region $\alpha 3$ covering the respective posting positions of the multiple posted pieces of information Id to If; and the region $\alpha 4$ covering the respective posting positions of the multiple posted pieces of information Ig to Ij.

After the highly-recommended regions $\alpha 1$ to $\alpha 4$ are formed in this way, a recommendation level is set for each of the regions $\alpha 1$ to $\alpha 4$. The recommendation level is set at five steps from "0" to "4." Thus, the region $\alpha 4$ of the largest number of posted pieces of information per unit area out of the regions $\alpha 1$ to $\alpha 4$ is set at level "4." Likewise, the regions $\alpha 1$, $\alpha 2$, and $\alpha 3$ are set at levels "1," "2," and "3," respectively.

In this embodiment, a display color differing between recommendation levels is set for each of the regions $\alpha 1$ to $\alpha 4$. As a result, as shown in FIG. 6, each of the highly-recommended regions $\alpha 1$ to $\alpha 4$ in an area surrounding a vehicle on which the navigation system 200 is mounted or an area requested by the user is visibly displayed in respective colors on the map on the display section 250.

In response to request for search for a route to a destination, a route passing through the regions $\alpha 3$ and $\alpha 4$ set at levels "3" and "4," respectively is searched for out of the regions $\alpha 1$ to $\alpha 4$ set at their respective recommendation levels, for example. In this embodiment, a route to the destination as a target of the request for route search is also searched for while each of elements including traveling time, a traveling distance, and traveling charge is considered as traveling cost. By conducting the search in consideration of the traveling cost, a route is searched for that minimizes each traveling cost.

As shown in FIG. 7, routes R1 to R3 from a current location Ps of a vehicle on which the navigation system 200 with the display section 250 is mounted to a destination Pg are displayed on the display section 250. The route R1 out of the routes R1 to R3 is one (happy route) searched for based on a recommendation level. The route R2 is one searched for while traveling time is considered as traveling cost. The route R2 is searched for so as to achieve the shortest traveling time from the current location Ps to the destination Pg. The route R3 is one searched for while a traveling distance is considered as traveling cost. The route R3 is searched for so as to achieve the shortest traveling distance from the current location Ps to the destination Pg.

The action of the route search device and that of the route search method of this embodiment are described next by referring to FIG. 8.

Figure 8:
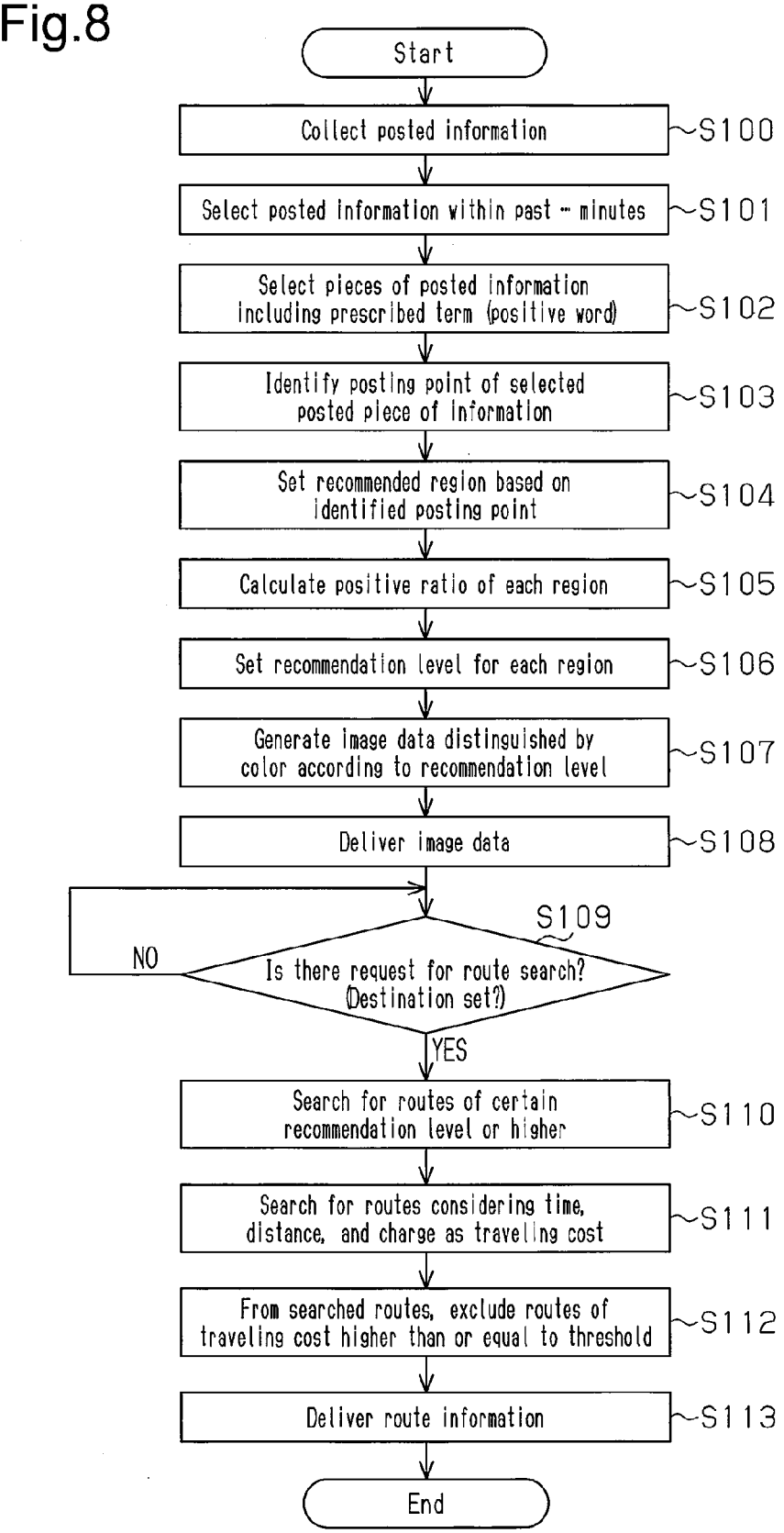
FIG. 8 is a flowchart showing an exemplary procedure of setting a recommendation level and an exemplary procedure of route search to be taken by the route search device and the route search method of the first embodiment.

As shown in FIG. 8, if multiple posted pieces of information are collected in the center 100 in step S100, pieces of information posted for example within the past 30 minutes are selected from these posted pieces of information (step S101). Further, posted piece of information including a term indicating a positive content such as that illustrated in FIG. 2 is selected (step S102).

After these posted pieces of information are selected, posting points of the posted pieces of information are identified based on latitude and longitude information, specifically position information in the selected posted pieces of information (step S103).

Next, based on the identified posting points, a recommended region is set where the presence of a high-recommended shop or point is assumed (step S104). Regarding this setting of the recommended region, a region within a range of a diameter of a few kilometers relative to one posting position as a center is set to be the recommended region, for example. If the presence of multiple posting points is assumed within a region in a range of a diameter of a few kilometers, a region in a range of a diameter of a few kilometers relative to each posting point as a center is set as a recommended region.

After the recommended region is set, a positive ratio is calculated according to the number of posted pieces of information covered in each recommended region (step S105). Next, the recommendation level of each region is set based on this positive ratio (step S106). This positive ratio is calculated based on the number of posted pieces of information including positive terms in each unit area of each region, for example.

After the recommendation level is set in this way, a color responsive to a corresponding recommendation level is allocated to each region. Based on a result of this allocation, image data is generated to be used to distinguish each region by color on a map screen (step S107). The image data thereby generated is delivered for example to the navigation system 200 having transmitted a request (step S108).

Then, the navigation system 200 performs display process on the received image data, thereby displaying an image illustrated in FIG. 5 or 6 on the display section 250. This enables the user who visually recognizes the display section 250 to recognize each region distinguished by color visually, thereby allowing the user to understand the recommendation level of each region.

If the center 100 receives a request for route search from the navigation system 200, the center 100 identifies the current location of the vehicle on which the navigation system 200 is mounted based on latitude and longitude information transmitted from the navigation system 200 (step S109: YES). Further, the center 100 identifies the destination as the target of the search request.

After the current location of the vehicle and the destination are identified in this way, a route is searched for that passes through a recommended region between the current location and the destination and set at a recommendation level of a certain level or higher, for example (step S110). A route is also searched for in consideration of each of traveling time, a traveling distance, and charge required for traveling through a toll road as traveling cost (step S111). A route that minimizes each traveling cost is searched.

If the route searched for based on the recommendation level entails traveling cost that is higher than or equal to a certain cost, such a route is excluded from candidate routes (step S112). Route information about each route not excluded and determined based on the recommendation level and each traveling cost is delivered to the navigation system 200 and the like having transmitted the request (step S113).

Then, the navigation system 200 performs the display process on the received route information, thereby displaying the image illustrated in FIG. 7 referred to previously on the display section 250.

As described above, the route search device and the route search method of this embodiment achieve the following advantages.

(1) Posted pieces of information including a prescribed term are selected from multiple pieces of information posted by users. Based on the selected posted pieces of information, a route for a vehicle is searched for. Thus, while a route is searched for based on an infinite number of posted pieces of information, the searched route reflects a point and the like indicated by the prescribed term. This contributes to effective use of piece of information posted by users, contributing to increased variety of route guidance.

(2) A route searched for as a route to be offered passes through a particular point indicated by posted pieces of information selected based on a prescribed term. Thus, if the user sets a destination, a route passing through the particular point indicated by the posted piece of information selected based on the prescribed term is searched for out of multiple routes along which the destination is accessible from the current location. This allows guiding of a route capable of passing through a highly-recommended point and the like indicated by posted piece of information while guiding the route to the destination set by the user.

(3) Posting positions of posted pieces of information are identified based on position information included in the posted pieces of information selected based on a prescribed term. A route covering a relatively large number of identified posting positions is searched for. Thus, the prescribed term is reflected particularly in the searched route. As a result, even if there are an infinite number of routes from a departure point to a destination and there are multiple selected posted pieces of information, a route can still be searched for according to the prescribed term.

(4) Posted pieces of information are managed in units of predetermined regions based on posting positions of these posted pieces of information. A recommendation level of each region is set based on a result of selection of one or multiple posted pieces of information covered in a region for management. Thus, even if there are an infinite number of posted pieces of information and there are an infinite number of posting positions of these posted pieces of information, these posted pieces of information are managed while the predetermined region is considered as a unit. Thus, the amount of piece of information to be processed for setting a recommendation level and searching for a route is reduced. This reduces processing load involved in setting a recommendation level and searching for a route, so that a recommendation level is set and a route is searched for smoothly. Even if a posted piece of information including false content, a less-accurate posted piece of information or the like is mixed in each region, for example, setting a recommendation level of each region while considering such a region for management as a unit can make such posted pieces of information that might be a cause for noise less influential. This maintains a high degree of reliability of a recommendation level and that of a result of route search.

(5) Traveling cost of a route searched for based on a prescribed term is determined while each of traveling time, a traveling distance, and traveling charge is considered as traveling cost. A route by which the traveling cost is higher than or equal to a prescribed threshold is excluded. Thus, a route of low economic efficiency due to high traveling cost is excluded, so that a route to be presented further makes allowance for traveling cost. As a result, a more useful route is presented.

(6) Posted pieces of information including a positive term relating to at least a particular point or shop are selected as posted pieces of information to be used for route search. Thus, the searched route can guide many users to the recommendable point. As a result, only posted pieces of information of significantly high usefulness is selected from an infinite number of posted pieces of information and a route that can offer guidance to a target indicated by the selected posted piece of information is searched for.

(7) The display section 250 forming the route presenting section is provided in the navigation system 200 to receive a result of route search. Thus, the result of route search from the center 100 is presented to the user through the display section 250.

(8) A route is further determined while each of traveling time, a traveling distance, and traveling charge required for traveling is considered as traveling cost. Then, the route determined based on the traveling cost and a route searched for based on posted piece of information are both presented. Thus, not only a route searched for based on posted pieces of information but also a route searched for based on each traveling cost can be presented. This realizes presentation of routes searched for based on multiple elements, contributing to expansion of a range of selection of a route.

(9) The present route search device is provided in the center 100 that collects posted pieces of information and delivers information about a route searched for based on the collected posted pieces of information to an information terminal. Thus, route search based on multiple posted pieces of information can be centralized in the center 100. This achieves delivery of information about a route to a larger number of information terminals, eventually, presentation of a route searched for based on posted pieces of information to a larger number of users. Additionally, the enhanced functionality of the center 100 contributes to increase in speed of route search process.

(10) The aforementioned information terminal is formed of the navigation system 200 mounted on a vehicle forming a mobile object. Thus, a navigation system widely used as an on-board system for route search can be responsible for route search based on posted piece of information. This contributes to effective use of a route to be searched for based on posted piece of information.

Second Embodiment

The following describes a route search device and a route search method according to a second embodiment of the present invention by referring to FIGS. 9 to 12. The following description is mainly intended for differences from the first embodiment. A basic structure of a route search device and that of a route search method of this embodiment are the same as those of the first embodiment. In FIGS. 9 to 12, elements substantially the same as those of the first embodiment are identified by the same signs and description common to these embodiments will not be given.

Figure 9:
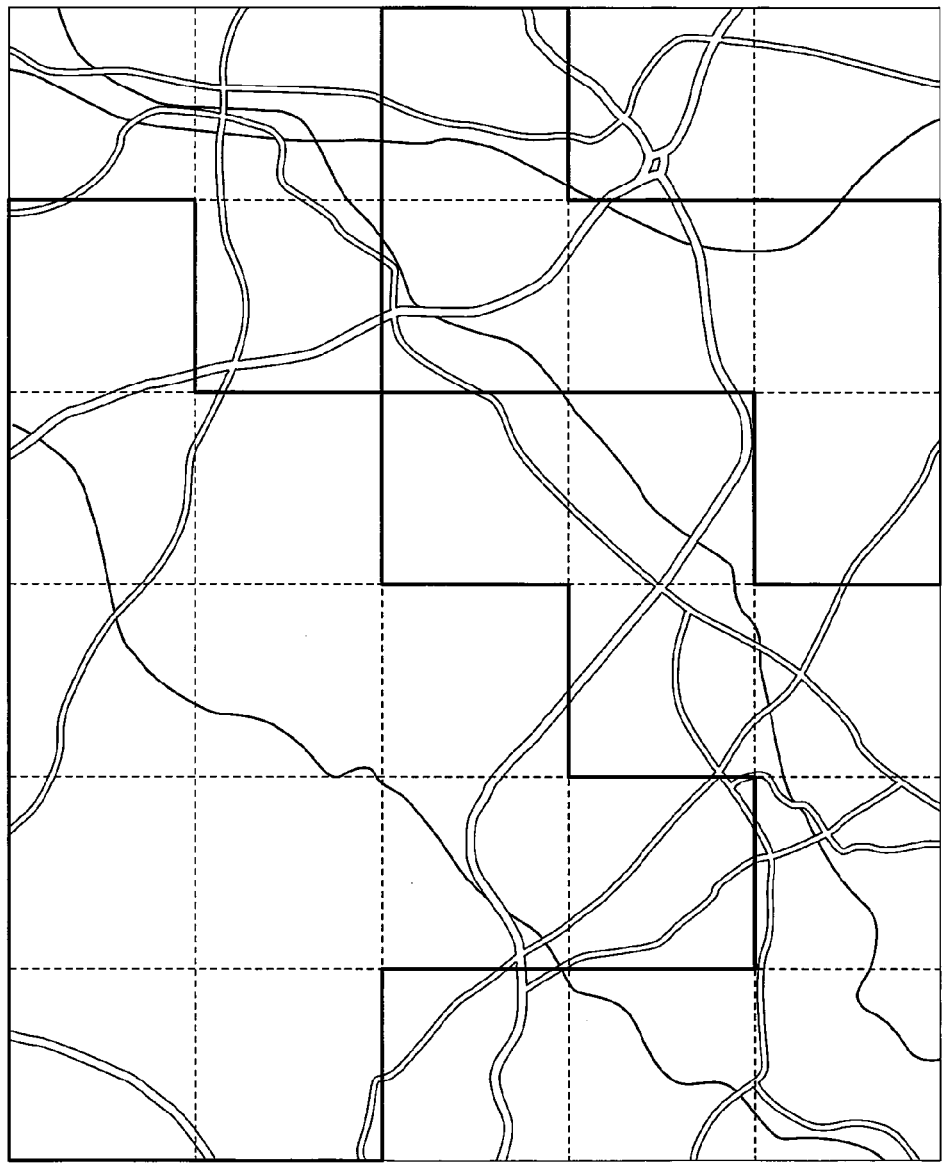
FIG. 9 shows exemplary map regions defined as management units for posted pieces of information relating to a route search device and a route search method according to a second embodiment of the present invention.

As illustrated in FIG. 9, the information managing section 122 of this embodiment partitions an area where pieces of information are posted into multiple regions in a matrix, each having a range of a few kilometers, for example. The information managing section 122 manages posted pieces of information while using each of partitioned regions in a matrix as a unit.

The information managing section 122 sets a recommendation level of each region based on the number of posting positions of posted pieces of information including positive contents covered in each region. For this setting, the information managing section 122 counts the number of posted pieces of information including positive contents posted in each region. Then, the information managing section 122 sets a recommendation level of each region responsive to the counted number. Further, the information managing section 122 sets an individual display color of each region responsive to the recommendation level.

A region $\beta1$ set at recommendation level "0" for the absence of posted piece of information is determined to be a region not requiring highlighted display. Thus, the region $\beta1$ is set to be colorless, for example. As different examples, respective display colors are allocated to regions $\beta2$ to $\beta8$ set at recommendation level "1", regions $\beta9$ to $\beta12$ set at recommendation level "2," and regions $\beta13$ and $\beta14$ set at recommendation level "3.

Figure 10:
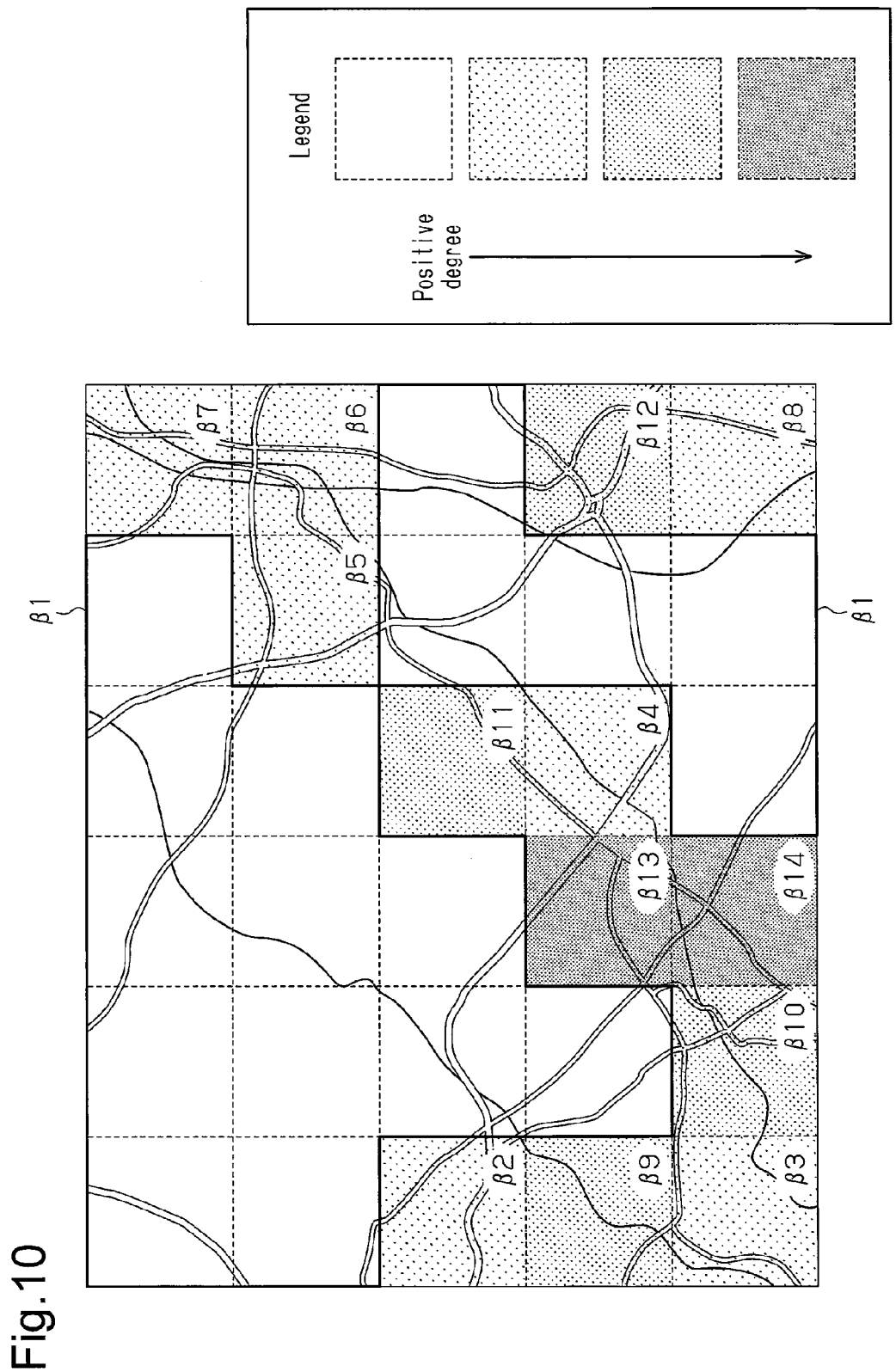
FIG. 10 shows exemplary display of recommendation levels set in map regions defined as management units.

As illustrated in FIG. 10, in response to a request from the user to present the recommendation level of a particular area, an image including multiple partitioned regions in a matrix distinguished by color is displayed on the display section 250.

Figure 11:
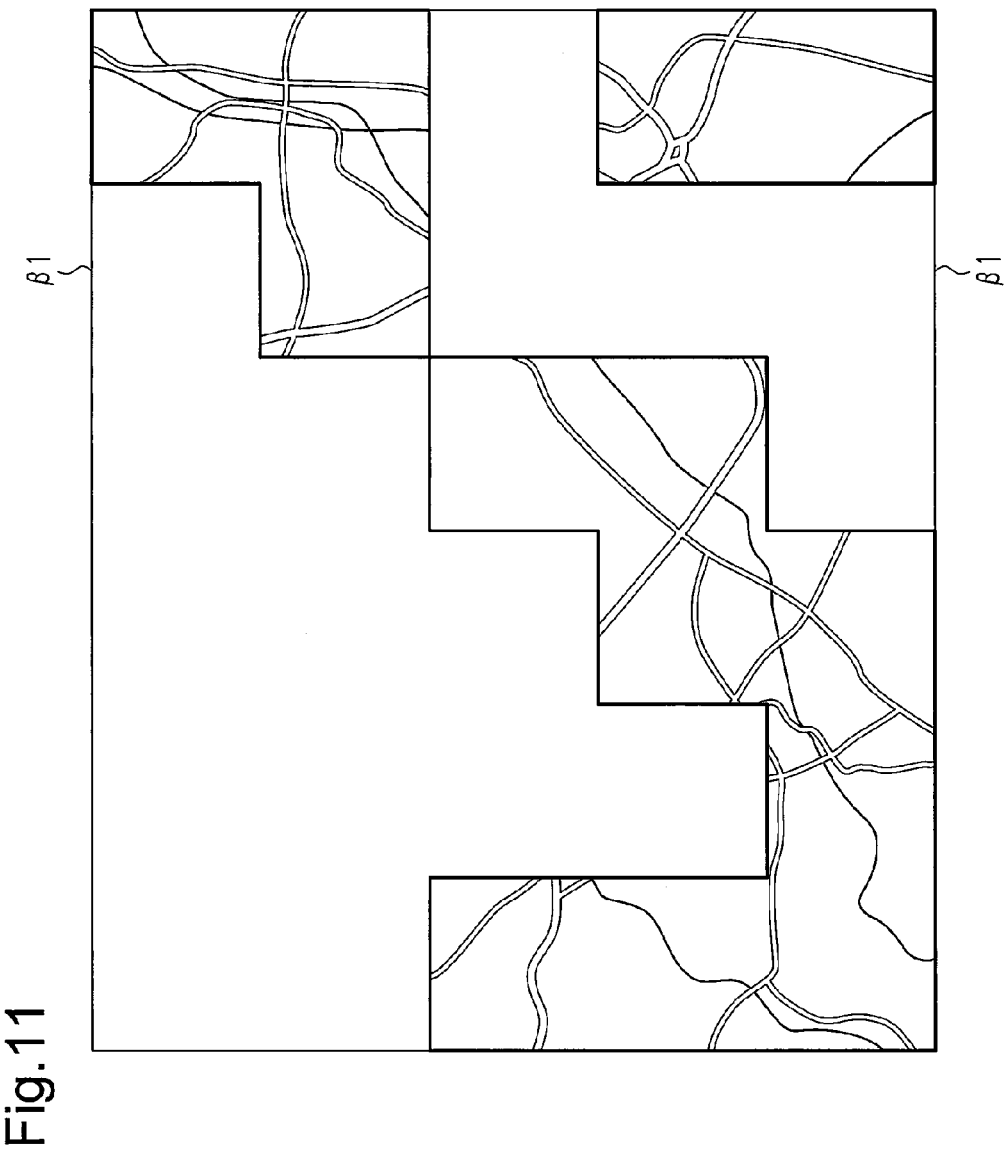
FIG. 11 shows an exemplary map image including selected map regions at a predetermined recommendation level.
Figure 12:
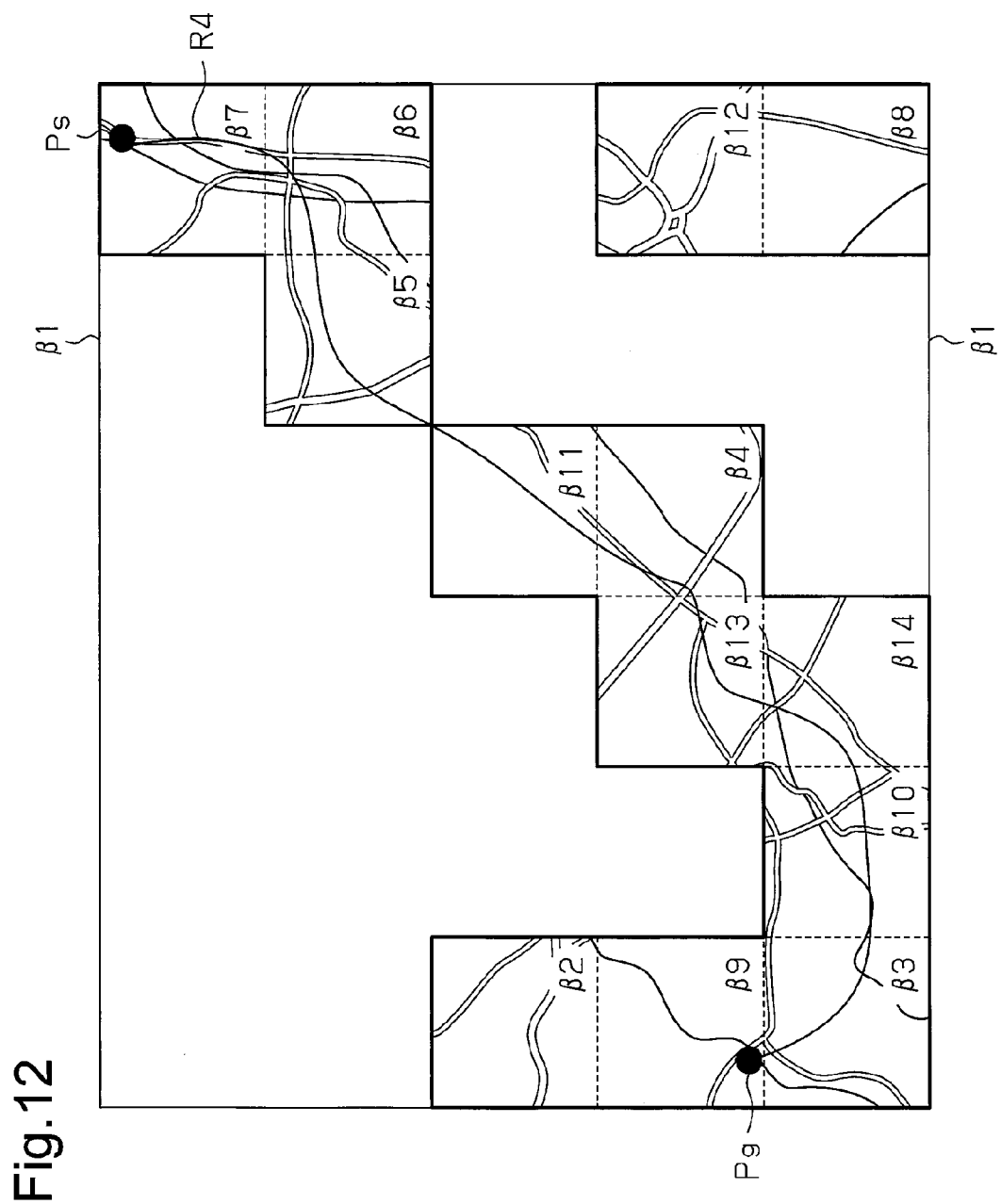
FIG. 12 shows exemplary route search based on a recommendation level of a map region defined as a management unit.

As illustrated in FIG. 11, for search for a route from a departure point Ps toward a destination Pg, the regions $\beta2$ to $\beta14$ set at recommendation level "1" or higher are selected as candidates for a route to pass through these regions. Then, as shown in FIG. 12, a route R4 is searched for as a route determined based on a recommendation level. The searched route R4 is presented on the display section 250.

As described above, the route search device and the route search method of this embodiment achieve the following advantage in addition to the aforementioned advantages (1) to (10).

(4A) Posted pieces of information are managed while a partitioned region forming a matrix is used as a unit. A recommendation level is set based on the amount of posted pieces of information included in each region for management. As a result, a management unit for posted pieces of information can be formed by partitioning more easily and each region formed by the partitioning can be managed more easily. Further, posted pieces of information are managed flexibly in response to a defined region.

Third Embodiment

Figure 13:
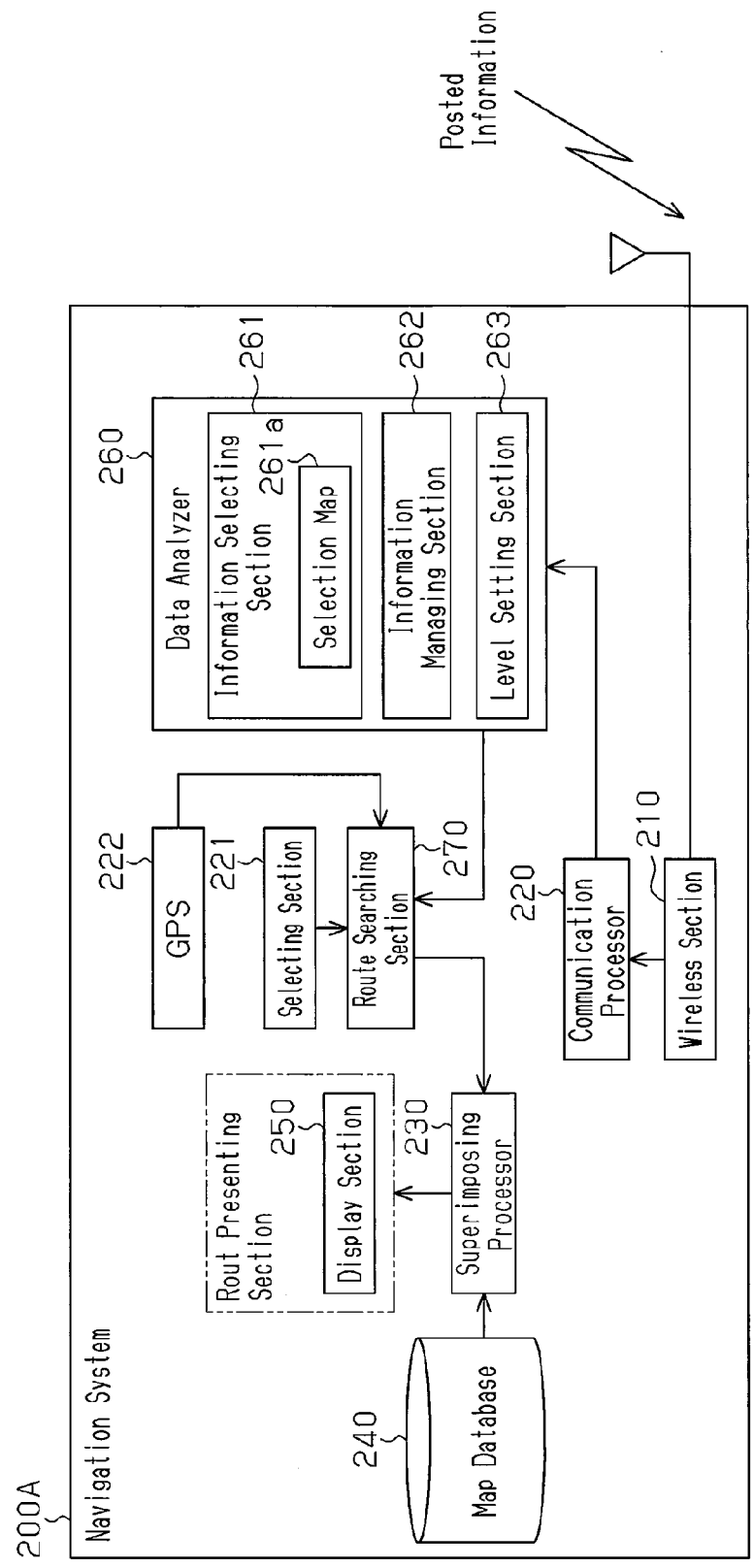
FIG. 13 is a block diagram schematically showing the structure of a center and that of a multifunctional phone to which a route search device and a route search method according to a third embodiment of the present invention are applied.

The following describes a route search device and a route search method according to a third embodiment of the present invention by referring to FIG. 13, which corresponds to FIG. 1. The following description is mainly intended for differences from the first embodiment. A basic structure of a route search device and that of a route search method of this embodiment are the same as those of the first embodiment. In FIG. 13, elements substantially the same as those of the first embodiment are identified by the same signs and description common to these embodiments will not be given.

As shown in FIG. 12, a navigation system 200A of this embodiment further includes a data analyzer 260 and a route searching section 270 having functions conforming to those of the data analyzer 120 and the route searching section 140 of FIG. 1, respectively.

The data analyzer 260 is formed of an information selecting section 261, a selection map 261a, an information managing section 262, and a level setting section 263 having functions conforming to those of the information selecting section 121, the selection map 121a, the information managing section 122, and the level setting section 123, respectively.

The action of the route search device and that of the route search method of this embodiment are described next.

If posted pieces of information are delivered for example from a center that manages posted pieces of information, the wireless section 210 forming the navigation system 200A receives the delivered posted pieces of information.

The communication processor 220 acquires the posted pieces of information received by the wireless section 210 and outputs the received posted pieces of information to the data analyzer 260.

The information selecting section 261 forming the data analyzer 260 selects posted pieces of information from the input posted pieces of information. The posted pieces of information selected here were posted, for example, within the past 30 minutes and include positive contents. The information selecting section 261 outputs the selected posted pieces of information to the information managing section 262.

The information managing section 262 identifies the posting positions of the input posted pieces of information based on latitude and longitude information in each posted piece of information. Further, the information managing section 262 defines each region to be a management unit for posted piece of information.

The level setting section 263 sets a recommendation level of each region defined as a management unit. Then, the level setting section 263 outputs information about the set recommendation level of posted pieces of information in each region to the route searching section 270. Further, the level setting section 263 outputs the information about the set recommendation level of posted pieces of information in each region to the superimposing processor 230.

If the user sets a destination, the route searching section 270 identifies the current location of the vehicle on which the navigation system 200A is mounted based on latitude and longitude information acquired from the GPS 222. Then, the route searching section 270 searches for a route from the identified current location of the vehicle to the destination based on the information about the recommendation level of posted pieces of information in each region. Further, the route searching section 270 searches for a route that minimizes each of elements including traveling time, a traveling distance, and charge required for traveling, for example. The route searching section 270 outputs information about each of the searched routes to the superimposing processor 230.

In response to input of the information about the recommendation level of posted pieces of information in each region, the superimposing processor 230 acquires map data indicating an area surrounding the vehicle on which the navigation system 200A is mounted or an area requested by the user from the map database 240. Then, the superimposing processor 230 generates an image in which the recommendation level of posted pieces of information in each region is to be superimposed on a map image indicated by the acquired map data. The superimposing processor 230 outputs an image thereby generated to the display section 250. As a result, the image input from the superimposing processor 230 indicating the recommendation level of each region is displayed on the display section 250.

In response to input of information about each route, the superimposing processor 230 acquires map data indicating an area covering the current location of the vehicle on which the navigation system 200A is mounted and the destination from the map database 240. Then, the superimposing processor 230 generates an image in which the information about each route is to be superimposed on a map image indicated by the acquired map data. The superimposing processor 230 outputs an image thereby generated to the display section 250. As a result, the image input from the superimposing processor 230 indicating each route is displayed on the display section 250.

As described above, the route search device and the route search method of this embodiment achieve the advantages of the aforementioned (1) to (8) and (10) as well as the following advantages instead of that of the aforementioned (9).

(9A) The present route search device is provided in the navigation system 200A including the route presenting section that collects the posted pieces of information and presents information about a route searched for based on the collected posted pieces of information. Thus, only acquisition of posted pieces of information is required in order for the navigation system 200A to search for a route by itself. This allows the navigation system 200A to search for a route and present information about the route, so that the route is searched for and presented more flexibly.

Other Embodiments

Each of the aforementioned embodiments may also be implemented in the following modes.

In each of the aforementioned embodiments, a recommendation level is set at five steps. Alternatively, the recommendation level may be set at four or fewer steps or six or more steps.

In each of the first and second embodiments, the navigation system 200 (including 200A) has a structure with the map database 240. Alternatively, the navigation system 200 may also have a structure without the map database 240. In this structure, the center 100 generates image data to be used for superimposing information about a recommendation level or a route on a map, and delivers the resultant image data to the navigation system 200. The navigation system 200 displays the image data delivered from the center 100 on the display section 250. In this case, the navigation system 200 is only required to perform process of displaying image data delivered from the center 100, so that a guidance of a recommendation level or a route can be performed more easily.

In each of the first and second embodiments, the center 100 delivers information about a result of route search and information about a recommendation level. Alternatively, the center 100 may deliver only information about the result of route search.

In each of the aforementioned embodiments, a recommendation level is set based on the number of posted pieces of information including positive contents. Alternatively, if posted pieces of information including positive contents and posted pieces of information including negative contents both exist in a particular region, the recommendation level may be lowered according to the number of posted pieces of information including negative contents.

In each of the aforementioned embodiments, information about the latitude and longitude where a piece of information was posted is used as position information. Alternatively, if the content of posted pieces of information includes a term indicating a particular place name, information about this term may be used as position information.

In each of the aforementioned embodiments, a positive ratio calculated based on the number of posted pieces of information per unit area is converted to a recommendation level. This recommendation level is a target of display and used for route search. Alternatively, a positive ratio may be a target of display and may be used for route search without being converted to a recommendation level.

In each of the aforementioned embodiments, a recommendation level (positive ratio) is set based on the number of posted pieces of information indicating positive contents. Alternatively, a recommendation level may be set according to the contents of posted pieces of information. In this case, a recommendation level is set according to the type of emoticons or exclamation marks included in posted pieces of information. In this case, if posted pieces of information include a term indicating a degree such as "awesome," "pretty good," or "so-so," a recommendation level is set according to the degrees indicated by such terms.

In each of the aforementioned embodiments, a region set at a recommendation level is distinguished by color. Alternatively, a region set at a recommendation level may blink according to the recommendation level, for example. In this case, a region at a high recommendation level blinks while a region at a low recommendation level always lights up, for example. As another example, where a region at any recommendation level blinks, the frequency of the blinking may be changed according to the recommendation level.

In each of the aforementioned embodiments, a searched route and a recommendation level of each region are displayed. Alternatively, only the searched route may be displayed.

In each of the aforementioned embodiments, a searched route passes through a recommended region existing between the current location of the vehicle and the set destination and placed at a recommendation level higher than or equal to a certain level. Alternatively, a searched route may pass through all recommended regions existing between the current location of the vehicle and the set destination.

In each of the aforementioned embodiments, a route by which traveling cost is higher than or equal to a predetermined value is excluded from routes searched for based on posted pieces of information. Alternatively, a process of calculating traveling cost of a route searched for based on posted piece of information may be omitted. Then, all routes searched for based on posted pieces of information may be presented.

In each of the aforementioned embodiments, traveling time, a traveling distance, and traveling charge are all used as traveling cost. Alternatively, at least one of traveling time, a traveling distance, and traveling charge may be used as traveling cost. Still alternatively, traveling cost may also be the amount of fuel to be consumed or the amount of electricity to be consumed, for example.

Figure 14:
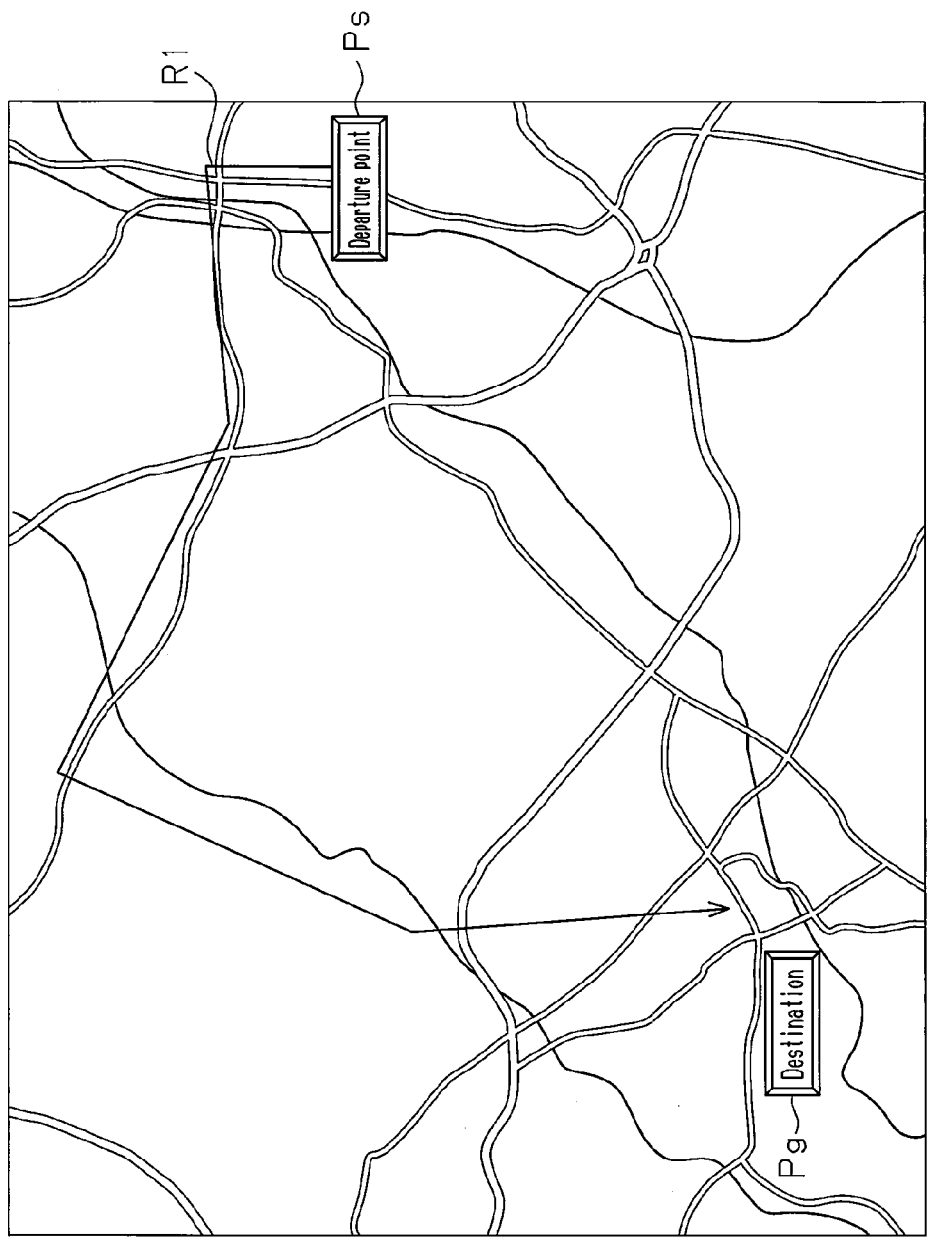
FIG. 14 shows exemplary display of a route searched for by a route search device and a route search method according to another embodiment of the present invention.

In each of the aforementioned embodiments, a route (R2, R3) searched for based on traveling cost is presented separately from a route searched for based on posted pieces of information (R1 in FIG. 7). Alternatively, as illustrated in FIG. 14, presentation of the route (R2, R3) searched for based on traveling cost may be omitted and only the route R1 searched for based on posted piece of information may be displayed.

In each of the aforementioned embodiments, if all the routes searched for based on posted pieces of information are excluded as a result of exclusion of route based on traveling cost, the recommendation level is lowered by one step. Then, a route is searched for and traveling cost is calculated based on this recommendation level lowered by one step. Alternatively, if there is no route as a result of exclusion of routes based on traveling cost, a route entailing the lowest traveling cost may be selected from routes targeted for exclusion.

In each of the aforementioned embodiments, posted pieces of information within 30 minutes after the posting are selected as posted pieces of information to be used for route search. Alternatively, posted piece of information after more than 30 minutes after the posting may also be selected as posted pieces of information to be used for route search. If a posted piece of information to be selected is posted at a time closer to timing of its selection, posted content indicated by such a posted piece of information is enhanced further in terms of its real-time performance.

In each of the aforementioned embodiments, posted pieces of information including term indicating positive contents are selected as posted pieces of information to be used for route search. Alternatively, posted pieces of information to be selected may include terms indicating negative contents such as congestion in some areas meaning that the circumstance of a particular point does not fit the user's expectation. A region indicating the posting positions of the posted pieces of information including the term indicating the negative contents may be presented. A route bypassing such a region may be searched for.

In the aforementioned first and third embodiments, posted pieces of information are managed and a recommendation level is set while a predetermined region within a range of a diameter of 10 km is used as a unit. In the aforementioned second embodiment, posted pieces of information are managed and a recommendation level is set while a partitioned region forming a matrix is used as a unit. Alternatively, posted pieces of information may be managed and a recommendation level may be set while a domicile such as the name of a municipality, an address, or a place name is used as a unit, for example. In this case, setting of a recommendation level and route search reflecting regional characteristics is performed. In this case, posted pieces of information are managed while a region with a common place name is used as a unit, so that posted pieces of information likely to have a common posted content are managed in units of regions. Still alternatively, a management unit for posted pieces of information can be a region such as that set by the user and can be changed, if appropriate.

In each of the aforementioned embodiments, posted pieces of information are selected based on whether the posted pieces of information include a term registered with the selection map 121a or 261a. Alternatively, posted pieces of information may be selected based on whether the posted pieces of information include a particular term set by the user, for example.

In each of the aforementioned embodiments, the aforementioned route presenting section is formed of the display section 250 or 350. Alternatively, the route presenting section may be formed of an audio device that guides a result of setting of a recommendation level or a result of route search by voice. Still alternatively, the route presenting section may be formed of the display section 250 or 350 and the audio device.

In each of the aforementioned embodiments, road conditions, shops, the scenery, and the weather are used as attributes to be used for selecting posted piece of information. Alternatively, at least one of road conditions, shops, the scenery, and the weather may be used as an attribute to be used for selecting posted pieces of information. An attribute to be used for selecting posted pieces of information is required only to indicate the type of an element reflecting the characteristics of some region and can be changed, if appropriate.

In each of the aforementioned embodiments, for display of a recommendation level or route search, posted pieces of information are selected and a recommendation level is set as needed. Alternatively, a recommendation level unique to each area may be set in advance based on pieces of information such as "good environment for living" or "uncrowded road," for example. A recommendation level may be calculated based on posted pieces of information selected for display of a recommendation level or route search, and the calculated recommendation level may be added to the recommendation level unique to each area. In this case, if a route passing through a region set at level "2" as a unique recommendation level is being used for traveling and if pieces of information comparable to a recommendation level "3" are posted during the traveling that recommends a shop existing on this route, for example, the recommendation level of this region increases from "2" to "5." This encourages dropping by this shop on the recommended route. In this case, a highly-recommended region is recommended stably while the fluctuating content of posted pieces of information is also reflected.

In each of the aforementioned embodiments, a route passing through a region set based on posted pieces of information is searched for. Alternatively, a point identified based on posted pieces of information may be set as a destination and a route to this destination may be searched for.

Figure 15:
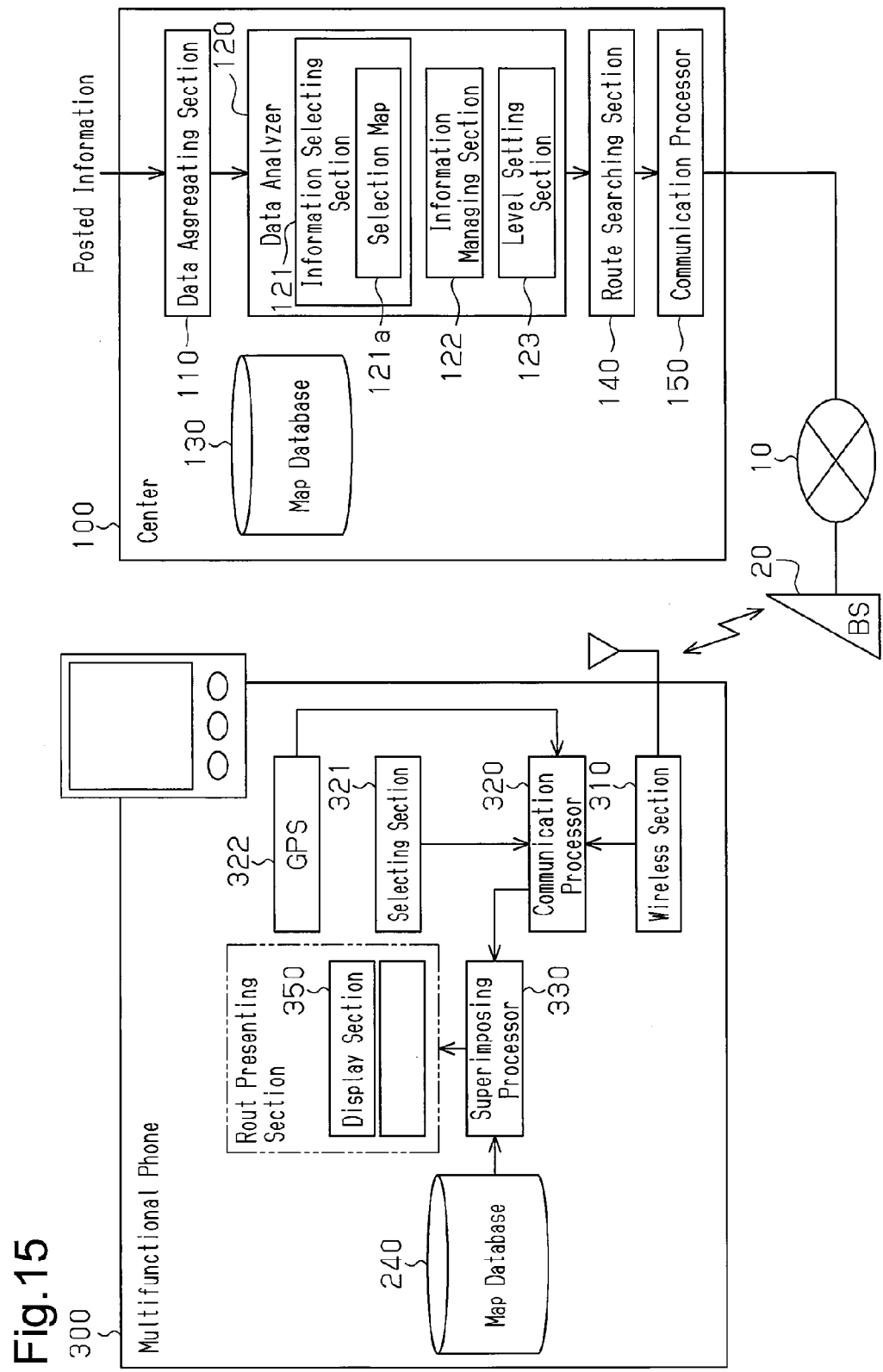
FIG. 15 is a block diagram schematically showing the structure of a center and that of a multifunctional phone to which a route search device and a route search method according to another embodiment of the present are applied.

In each of the aforementioned first and second embodiments, pieces of information indicating a recommendation level or a route delivered from the center 100 is displayed on the navigation system 200 mounted on the vehicle. Alternatively, as illustrated in FIG. 15, which corresponds to FIG. 1, pieces of information indicating a recommendation level or a route delivered from the center 100 may be displayed on a multifunctional phone 300 such as a smartphone. The multifunctional phone 300 includes a wireless section 310, a communication processor 320, a selecting section 321, and a GPS 322 having functions conforming to those of the wireless section 210, the communication processor 220, the selecting section 221, and the GPS 222 of the navigation system 200, respectively. The multifunctional phone 300 further includes a superimposing processor 330, a map database 340, and a display section 350 having functions conforming to those of the superimposing processor 230, the map database 240, and the display section 250, respectively. This also achieves the aforementioned advantages (1) to (10) and enhances the general versatility of the route search device and that of the route search method. In this case, the user can get in and out of a vehicle while carrying the multifunctional phone 300 or install the multifunctional phone 300 on the vehicle. Specifically, a mobile object is not limited to a vehicle but it may also be a person holding an information terminal such as the multifunctional phone 300.

Figure 16:
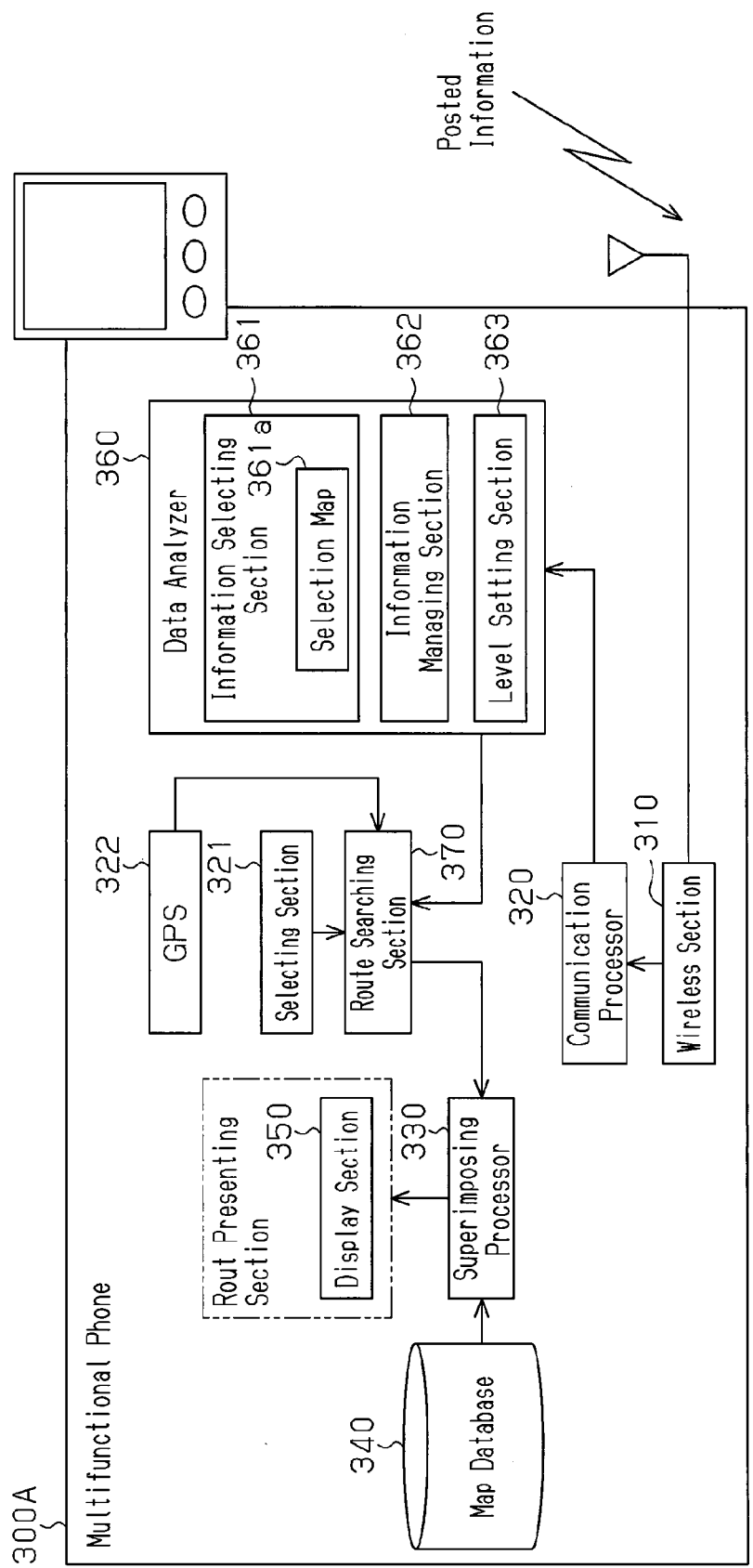
FIG. 16 is a block diagram schematically showing the structure of a center and that of a multifunctional phone to which a route search device and a route search method according to another embodiment of the present invention are applied.

In the aforementioned third embodiment, pieces of information indicating a recommendation level or a route delivered from the center 100 is displayed on the navigation system 200A mounted on the vehicle. Alternatively, as illustrated in FIG. 16, which corresponds to FIG. 1, piece of information indicating a recommendation level or a route delivered from the center 100 may be displayed on a multifunctional phone 300A such as a smartphone. The multifunctional phone 300A includes a wireless section 310, a communication processor 320, a selecting section 321, and a GPS 322 having functions conforming to those of the wireless section 210, the communication processor 220, the selecting section 221, and the GPS 222 of the navigation system 200A, respectively. The multifunctional phone 300A further includes a superimposing processor 330, a map database 340, and a display section 350 having functions conforming to those of the superimposing processor 230, the map database 240, and the display section 250 of the navigation system 200A, respectively. The multifunctional phone 300A further includes a data analyzer 360 and a route searching section 370 having functions conforming to those of the data analyzer 260 and the route searching section 270 of the navigation system 200A, respectively. The superimposing processor 330, the data analyzer 360, the route searching section 370 and others may be configured as respective application programs that can be installed on the multifunctional phone 300. This also can achieve the aforementioned advantages (1) to (10) and enhance the general versatility of the route search device and that of the route search method.

DESCRIPTION OF THE REFERENCE NUMERALS

10 VPN
20 Base station
100 Center
110 Data aggregating section
120 Data analyzer
121 Information selecting section
121a Selection map
122 Information managing section
123 Level setting section
130 Map database
140 Route searching section
150 Communication processor
200, 200A Navigation system
210 Wireless section
220 Communication processor
221 Selecting section
222 GPS
230 Superimposing processor
240 Map database
250 Display section
260 Data analyzer
261 Information selecting section
261a Selection map
262 Information managing section
263 Level setting section
270 Route searching section
300, 300A Multifunctional phone
310 Wireless section
320 Communication processor
321 Selecting section
322 GPS 330 Superimposing processor
340 Map database
350 Display section
360 Data analyzer
370 Route searching section

The invention claimed is:

1. A route search device that searches for a route for a mobile object, comprising:
   a data aggregating section configured by an information center that communicates with the mobile object, the data aggregating section aggregates posted pieces of information posted on an electronic information sharing network by multiple users, wherein each of the posted pieces of information include position information indicating posting positions of the posted pieces of information;
   an information selecting section, wherein, from among the posted pieces of information, the information selection section uses a piece of information for selection in which multiple terms relating to subjects of posting are prescribed in advance, thereby selecting one or more posted pieces of information that include at least one of the multiple terms prescribed in the selection information, wherein the multiple terms include a prescribed positive term relating to at least a particular point or shop;
   an information managing section that manages the posted pieces of information in units of predetermined regions each covering a posting position associated with this posted piece of information based on the posting positions of the posted pieces of information;
   wherein the information managing section manages the posted pieces of information while using as a unit one of a partitioned region forming a matrix, a region within a predetermined range, or a place name of a posting position;
   a level setting section that sets a recommendation level of each region based on the information amount and the prescribed positive terms of every selected posted piece of information associated with each region, respectively; and
   a route searching section that searches for a route for the mobile object based on the recommendation level of each of the regions.

2. The route search device according to claim 1, wherein the route searching section searches for a route that passes through a particular point indicated by the selected posted pieces of information.

3. The route search device according to claim 1, wherein based on position information about the selected posted pieces of information, the route searching section identifies posting positions associated with the selected posted pieces of information and searches for a route covering a relatively large number of the identified posting positions.

4. The route search device according to claim 1, wherein the route searching section determines that at least one of traveling time, a traveling distance, and traveling charge required for traveling is traveling cost, and excludes a route by which the determined traveling cost is higher than or equal to a prescribed threshold.

5. The route search device according to claim 1, further comprising a route presenting section that presents the searched route.

6. The route search device according to claim 5, wherein the route searching section further determines a route while using, as the traveling cost, at least one of traveling time, a traveling distance, and traveling charge required for traveling, and
   the route presenting section presents the determined route and the route searched for based on the selected posted pieces of information.

7. The route search device according to claim 1, wherein the route search device is provided in the information center that collects the posted pieces of information and delivers pieces of information about a route searched for based on the collected posted pieces of information to an information terminal.

8. The route search device according to claim 1, wherein the route search device is provided in an information terminal including a route presenting section that collects the posted pieces of information and presents pieces of information about a route searched for based on the collected posted pieces of information.

9. The route search device according to claim 7, wherein the information terminal is formed of at least one of a navigation system mounted on a vehicle forming the mobile object and a multifunctional phone capable of executing an application that offers route guidance based on the delivered pieces of information about the route.

10. A route search method that searches for a route for a mobile object, comprising:
    communication an information center with the mobile object;
    by the information center, aggregating posted pieces of information posted on an electronic information sharing network by multiple users, wherein each of the posted pieces of information include position information indicating posting positions of the posted pieces of information;
    from among the posted pieces of information, using a piece of information for selection in which multiple terms are prescribed in advance, thereby selecting one or more posted pieces of information that include at least one of the multiple terms prescribed in the selection information, wherein the multiple terms include a prescribed positive term relating to at least a particular point or shop;
    managing the posted pieces of information in units of predetermined regions each covering a posting position associated with the posted pieces of information based on the posting positions of the posted pieces of information;
    wherein the posted pieces of information are managed while using as a unit one of a partitioned region forming a matrix, a region within a predetermined range, or a place name of a posting position;
    setting a recommendation level of each region based on the information amount and the prescribed relative terms of every selected piece of information associated with each region, respectively;
    searching for a route for the mobile object based on the recommendation level of each of the regions.

11. The route search method according to claim 10, further comprising, when searching for a route for the mobile object, searching for a route that passes through a particular point indicated by the selected posted pieces of information.

12. The route search method according to claim 10, the method further comprising, when searching for a route for the mobile object, identifying posting positions associated with the selected posted pieces of information based on position information about the selected posted pieces of information, and searching for a route covering a relatively large number of the identified posting positions.

* * * * *